Feb. 24, 1970 L. E. EGBERT ET AL 3,496,709

AUTOMATIC TREE TRIMMING MECHANISM

Filed April 10, 1967 3 Sheets-Sheet 1

INVENTORS
LAWRENCE E. EGBERT
FRED W. SWAN
NORMAN E. TILMANN

ATTORNEYS

AUTOMATIC TREE TRIMMING MECHANISM

Filed April 10, 1967 3 Sheets-Sheet 2

INVENTORS
LAWRENCE E EGBERT
FRED W. SWAN
NORMAN E. TILMANN
Miller, Morriss, Pappas & McLeod
ATTORNEYS

AUTOMATIC TREE TRIMMING MECHANISM

Filed April 10, 1967 3 Sheets-Sheet 3

INVENTORS
LAWRENCE E. EGBERT
FRED W. SWAN
NORMAN E. TILLMANN
Miller, Morriss, Pappas & McLeod
ATTORNEYS United States Patent Office 3,496,709 Patented Feb. 24, 1970

3,496,709
AUTOMATIC TREE TRIMMING MECHANISM

Lawrence E. Egbert, Mount Pleasant, Mich.; Fred W. Swan, Weidman, Mich. 48893, and Norman E. Tilmann, Rte. 1, Mount Pleasant, Mich. 48858; said Egbert assignor to said Swan and said Tilmann Filed Apr. 10, 1967, Ser. No. 629,432
Int. Cl. H01g *3/04*
U.S. Cl. 56—237 9 Claims

ABSTRACT OF THE DISCLOSURE

An apparatus for automatic power trimming of Christmas trees into true conical form, in the field. A mobile overhead frame is provided to transport a straight edge power sickle over a tree; the power sickle is pivotally depended at an angle from a rotating carriage, thereby describing a conical surface. The sickle or cutter angle is adjustable so that the conical angle may be adjusted to various sized trees. The size of the cone is also variable by selection of the elevation of the conical apex. Motors both position and rotate the sickle or trimming bar.

BACKGROUND

The present invention relates to an automatic Christmas tree trimming apparatus and more particularly to such an apparatus utilizing a power driven limb and foliage cutter which revolves through a conical surface over a Christmas tree to shear the same into a regular conical form.

A well known industry is that of raising Christmas trees which involves the growing and harvesting of various evergreen trees to be cut for sale in the Yuletide season. Such trees may be members of any class of evergreen, for example various species of pines, spruces, and the like. A common problem encountered in the business of growing and harvesting such trees is that the annual trimming required to maintain the generally desired conical Christmas tree shape. The ideal configuration for a Christmas tree is generally considered to be the well known cone shape. In order to produce a tree with this particular symmetry it is necessary that the tree be trimmed annually into the desired conical configuration. If such is not done the natural growth of the tree will soon produce an unsightly, irregular and unshapely silhouette which cannot be sheared back to a uniformly full, conical growth. Such a tree is not acceptable for marketing to Christmastide purchases. Only by annual trimming of the tree to the desired conical outline can a true and full, marketable tree be ultimately obtained.

This trimming has heretofore been accomplished by a manual laborer in the field with a hand cutter, working his way arduously around the tree and cutting it back as closely as possible to the desired geometry by visually estimating where to cut, and how much to cut.

The present invention eliminates the need for numbers of manual laborers working down the rows of trees with knives and hand shearing the growths back to the desired shapes. The present invention accomplishes the same task automatically and with great speed beyond that obtainable by manual labor. A power driven foliage trim arm is used with saw tooth type blades in two sets, a stationary set of fingers, and an oscillating set of blades for cutting. The sickle or trimming arm is hung from an overhead rotating structure at an angle to the vertical. Rotation of the overhead carriage then sweeps the trim arm through a conical shape. When this geometric surface of revolution is generated around a Christmas tree the cutting blade skims its surface and prune it to the desired funnel form. Adjustability to various conical heights and angles is provided.

Thus the present invention eliminates the necessity of hiring manual laborers for trimming the trees, at relatively slow speed for relatively high wages.

Another problem involved in the trimming of such trees is the disadvantage of unskilled or unconcerned workers failing to trim the Christmas trees into a symmetric and true conical shape. Many workers have been observed to lack the necessary touch required to select the proper branches for cutting the tree to an exact conical outline. Still other workers lack the interest or are unwilling to exert the necessary concentration to produce a well-pruned tree. The present invention eliminates such problems by rapidly and automatically trimming the tree to an exact, symmetrically conical shape. The speed of the shearing is greatly increased and the uneven result of manual labor is replaced by the uniform and exact cut of a mechanized apparatus.

Consequently, it is an object of the present invention to provide an automatic Christmas tree trimming apparatus which will mechanically trim Christmas trees in the field, for enhancement of the ultimate appearance and marketability of the tree.

It is another object of this invention to provide a mechanism which can accomplish the annual trimming of the Christmas trees with a precision and uniformity greatly increased over that obtainable by previous manual methods.

It is another object of this invention to provide a Christmas tree trimming apparatus which can accomplish the above-mentioned trimming function with an enormous increase in speed over the manual methods previously used, and at a decreased cost.

Other objects and advantages of the present invention will be apparent to those skilled in the art, upon examination of the following description and drawings.

IN THE DRAWINGS

FIGURE 1 is a side elevation view of the present invention showing a portion of the carrier structure therefor, the main frame outrigged thereto, the rotary carriage, and the adjustable angle of the trimming arm. This adjustability, shown in dotted lines, permits conformance of the system to various sized Christmas trees, one particular size of tree being illustrated. The upper portion of FIGURE 1 shows the belt and chain drive mechanism for rotating the carriage, and a hydraulic cylinder for pivoting the entire main frame upwardly to clear the ground during transportation of the complete unit from one site to another.

Figure 4:
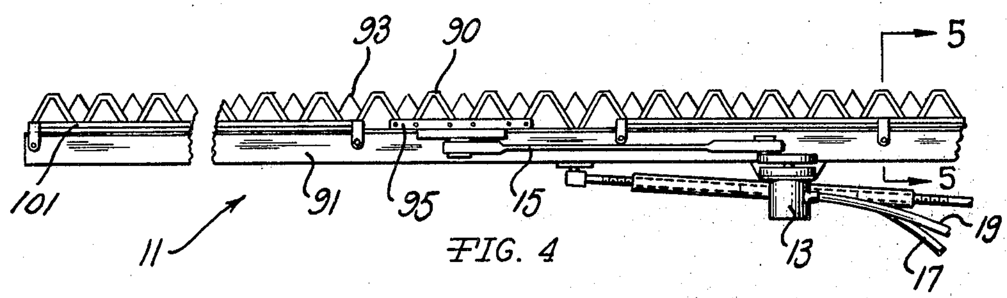

FIGURE 4 shows a front elevation view of the trim or cutter unit of the present invention, showing the truncated, reciprocating blades, and their hydraulic drive motor and connecting rod. Between the truncated saw tooth cutting blades are shown stationary saw tooth fingers. Also shown is a manual turnbuckle for changing the angle of the trimming arm.

Figure 5:
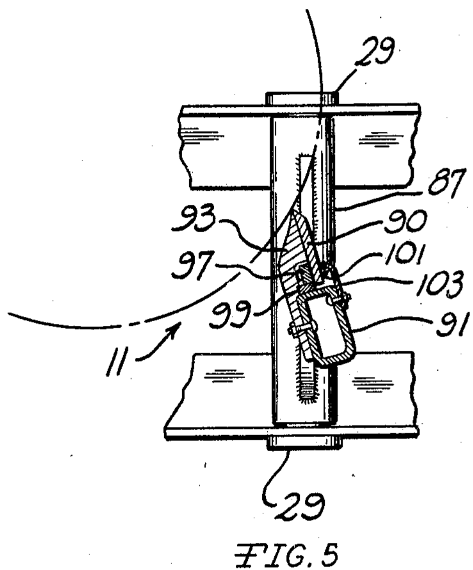

FIGURE 5 shows a sectional view of the cutter fingers and blades, taken on line 5—5 of FIGURE 4. The sickle or cutter bar is seen to be a box section disposed at a slight angle with the tangent to a circular section through the tree cone. Also shown is the sleeved articulation of the sickle bar from the cylindrical pivot bar, transversely of the positioning carriage.

Figure 1:
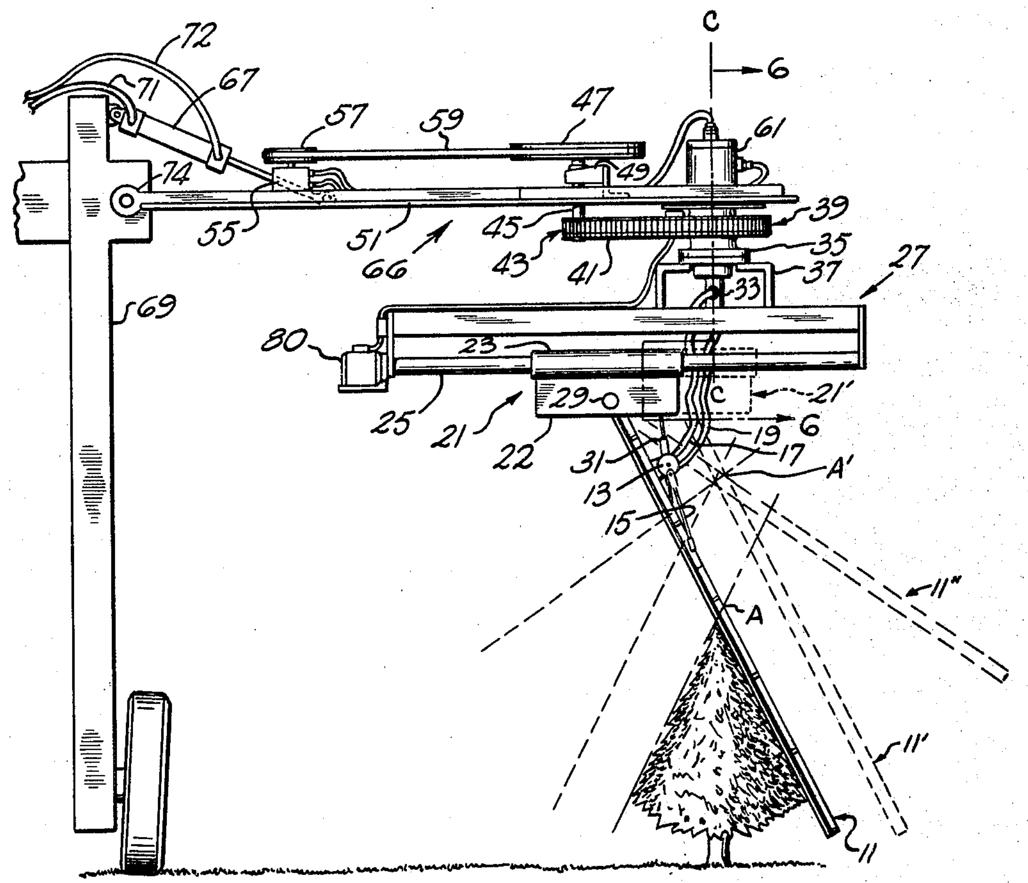
Figure 6:
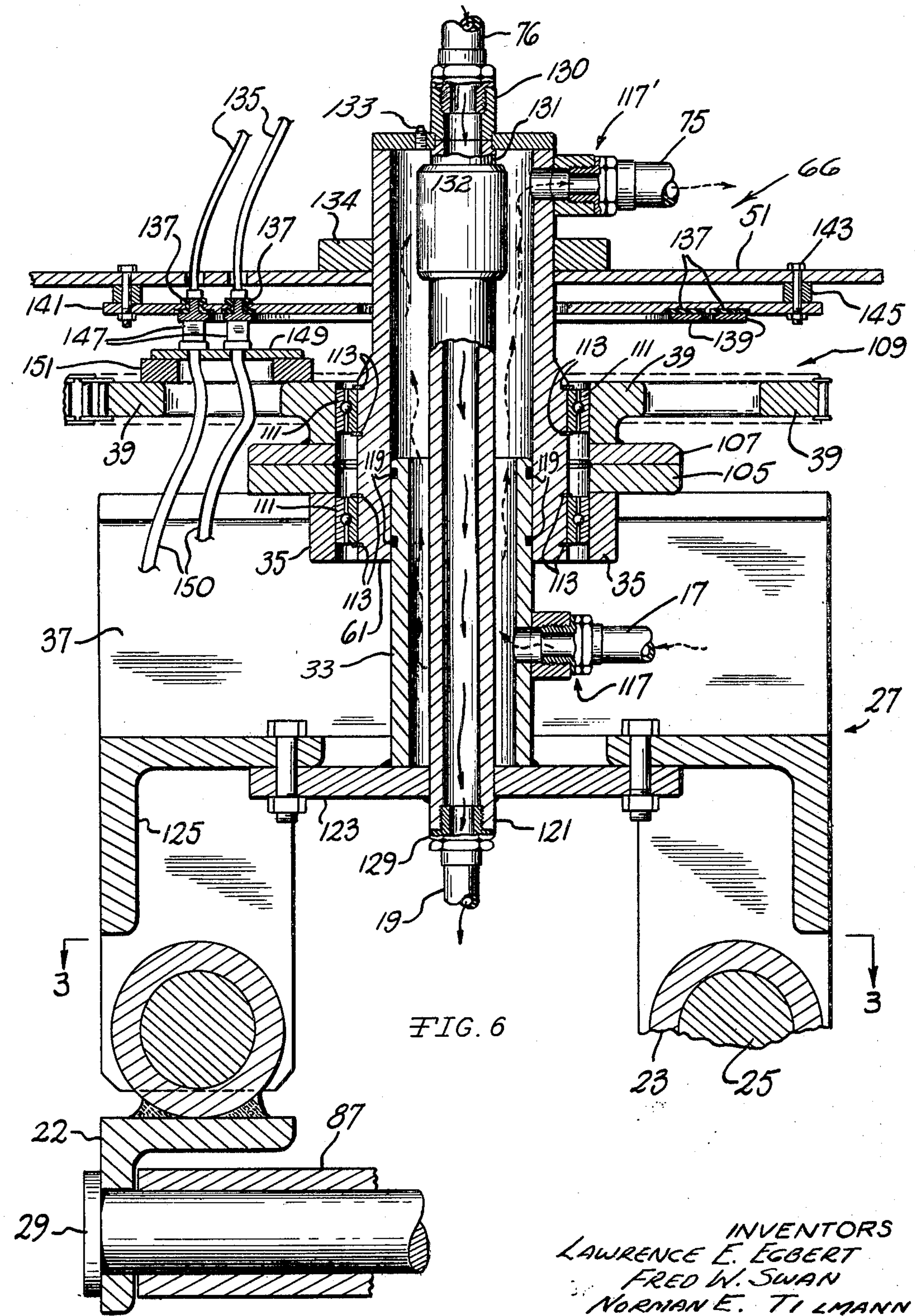

FIGURE 6 is a sectional view taken along lines 6—6 of FIGURE 1, showing in detail the entire fluid coupling unit which connects the hydraulic circuit between the upper stationary main frame, and the lower, revolving carriage.

GENERAL DESCRIPTION

The apparatus for accomplishing the above described result is a power driven cutter or trimming arm. It is essentially a straight edge power sickle pivotally depended at its upper end from a rotating overhead turntable or carriage. The sickle bar depends from the carriage at an angle to the vertical, and consequently rotation of the carriage causes the cutter revolvingly to generate a conical surface. The angle of the cutter is adjustable, as is the lateral location of its pivot point, so that the conical cut described may be selected to fit trees of varying girth or conical angle. These adjustable features enable the entire apparatus to be adapted to any size of tree rapidly, as the carriage mechanism moves along a row of trees. The entire process moves swiftly from tree to tree, and in a short time a great number of trees can be trimmed with unusual ease. Only a single operator is needed, to drive the transport on which the cutting unit is carried from tree to tree. The operator also adjusts the conical cut to the specific tree.

The entire conical cutting mechanism is transported by any suitable mobile support frame, which may carry its own means of locomotion and even a seat or cab for the operator. Such transport means might take the form of an overhead beam supported by high rising, wheeled, vertical struts, each of which would traverse one side of a row of trees. The entire unit would thus "straddle" a tree row to easily position the cutting head from directly above a selected tree. The unit would progress over the row easily, without undue obstruction from the closely growing trees, pausing at each tree to administer a conical "haircut."

SPECIFIC DESCRIPTION

FIGURE 1 shows a general view of the entire apparatus of the present invention. The working element of this disclosure is the trimming arm or sickle 11. shown in engagement with the side of a Christmas tree being trimmed and also shown in alternate positions 11' and 11''. The trimmer 11 utilizes oscillating blades driven by the hydraulic motor 13 via connecting rod 15. The hydraulic motor 13 is supplied with fluid under pressure through the input and return lines 17 and 19. The sickle 11 is seen to be pivoted at its upper end from a horizontal positioning carriage 27. The rotary positioning carriage 27 has tubular bars or tracks 25 upon which slides 21 are supported by sleeve portions 23. The hanger arms 22 of the slides 21 may then be selectably positioned along the tracks 25, thereby adjusting the trimmer to the desired conical height, e.g., A or A'. Lateral adjustability of the trimmer 11 is shown by the phantom line alernate position at 11'; the slide 21 also being displaced to the alternate position 21'. This shifts the conical cut to conformance with a taller tree (not shown) having apex A' and the same cone angle as the tree shown.

The angle of the trimmer 11 may be adjusted with respect to the vertical line of a tree trunk. This is accomplished by pivoting the cutter about pivot bar 29 to a new angle for conformance with a tree more steeply conical than the one shown, for example the angle illustrated by the alternate position 11'' of the trimmer. For purposes of illustration a mechanical means of making such an adjustment is shown, viz, the manual turnbuckle 31. It connects to the slide 21 at its upper end and to the cutter arm 11 at its lower end. In FIGURE 1 the view of the turnbuckle 31 is partially blocked by the interposing hydraulic motor 13 and its connecting rod 15. This lateral and angular adjustability will accommodate any height or girth of tree.

Rotation of the horizontal carriage 27 is centered on the axis of the cylindrical fluid coupling chamber 33, and therefore whenever the trimmer pivot 29 is not directly below this fluid connect 33, the trimmer 11 generates a doubly conical surface, with the apex thereof located somewhere between the upper and lower ends of the trimming arm. Variation of the elevation of the apex A correspondingly varies the size of the lower cone so as to accommodate any size of tree. If a less pointed conical shape is encountered, the trimmer 11 may be pivoted to depend less nearly vertically from point 29, as seen in the denotation of 11''. This will yield a taller cone, but if a short tree is involved, the cut may be relowered by displacing the trimmer on the carriage slides 21, back toward the center of the carriage rotation. Thus, the configuration of trim may be quickly adjusted to the height and width of Christmas tree encountered.

The carriage 27 is connected to the central hub 35 by the spider 37. The hub 35 is rotated by a drive sprocket 39, chain 41 and idler sprocket 43. Idler sprocket 43 is connected by the vertical shaft 45 to the idler wheel 47. The shaft 45 is rotatably supported by the journaling bracket 49, welded to the stationary support plate 51. The support plate 51 is held between a pair of outrigger arms 53, which extend from the transport vehicle 69. The plate or platform 51 also supports the hylraulic motor 55 and its associated drive wheel 57. The drive wheel motion is transmitted to the idler wheel 47 by belt 59. Secured to the platform 51 is the upper section 61 of the exterior chamber of the fluid coupling apparatus. This coupling structure, subsequently to be explained in more detail, provides for the transmission of hydraulic hose circuits to the fluid motor 13 on the revolving carriage 27. The upper section 61 forms a portion of a telescoped chamber and is attached rigidly, for example, by welding, to the stationary platform 51. The central hub 35 is antifrictionally mounted over the lower end of this upper cylinder section 61, and is revolved thereon by the drive sprocket 39.

Figure 2:
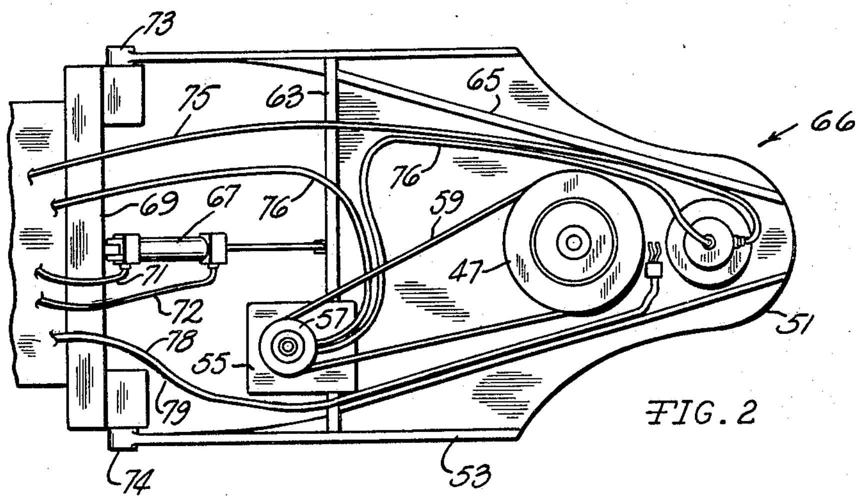
FIGURE 2 shows a top plan view of the main frame of the present invention, particularly illustrating the hydraulic circuity for actuating the carriage drive motor and the trim arm or cutter motor with both motors being shown as connected in series to the same hydraulic circuit.

FIGURE 2 views the support plate 51 and its attached appurtenances from above. In addition to the cantilevering support arms 53, the support plate 51 has additional framework comprised of the cross member 63 and diagonal stiffener 65. All this support structure is hereafter referred to compositely as a "main frame" 66. A lift piston 67 is shown, one end thereof articulated to the mobile support vehicle 69, and the other end attached to the cross stiffener 63 of the main frame 66. The main frame 66 may thus be hydraulically elevated on hinges 73 and 74, by fluid from lines 71 and 72. This enables the transport frame to move from one site to another with the tree trimming mechanism drawn upwardly away from interference with ground obstacles or tall growth. The hydraulic carriage motor 55 is seen with its belt drive structure comprised of wheel 57, belt 59, and idler wheel 47. The hydraulic circuitry leading to the rotary fluid coupling 61 is shown as flexible hoses 75 and 76 to which cutter drive motor 55 is connected in series with the blade oscillating motor 13. Electrical leads 78 and 79 disappear through plate 51 to connect ultimately with motor 80 on the turntable carriage 27. This electric motor 80 is utilized to drive the positioning slides 21. The details of the electric motor drive and current supply thereto will be described below.

Figure 3:
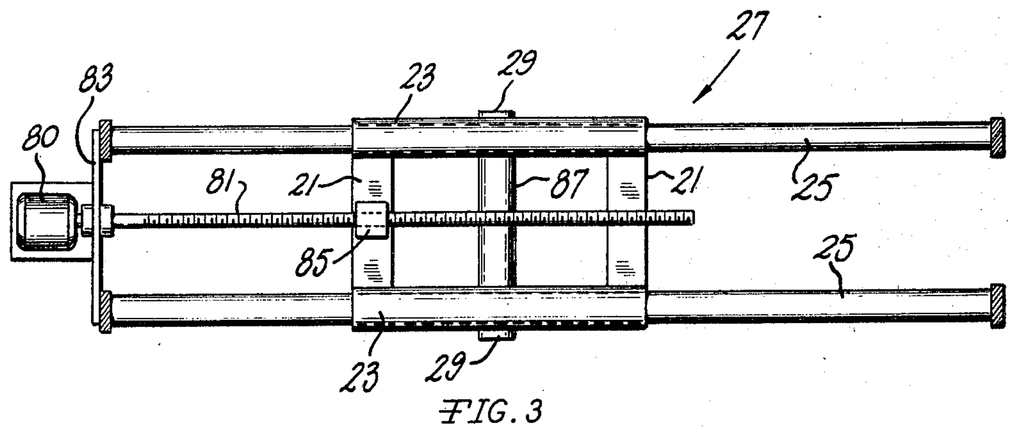
FIGURE 3 shows a top plan view of the positioning carriage of the present invention, to which is pivotally connected a foliage trim arm (not shown). An electric motor and drive worm is illustrated for motivation of the carriage on a pair of sleeves over the tubular tracks of the carriage structure.

FIGURE 3 shows a more detailed illustration of the workings of the rotating carriage 27. The lateral or horizontal positioning of the slide 21 is accomplished by means of a worm drive 81 driven by an electric motor 80 bracketed to a transverse member 83 across one end of the carriage structure. Slide 21 is provided with a pair of cylindrical sleeve portions 23 vaginated over a tubular track member 25. Worm 81 threads into a female worm nut 85 which is securely affixed, as by welding, to the slide frame 21. The entire slide mechanism moves right or left in accordance with the direction of rotation of the electric motor 80. A second sleeve structure 87 is journaled on pin 29 which transverses the slide structure below the worm 81. This second sleeve structure provides an articulated connection between the trimmer 11 and carriage 27.

FIGURE 4 shows in detail the cutting mechanism of the trimmer 11. A row of oscillating truncated saw tooth blades 90 is affixed to the trimmer arm 91 by the blade retainer bars 101. Between the saw tooth reciprocating blades 90 protrude the saw tooth cutting fingers 93 which initially engage the Christmas tree foliage and hold it for shearing by the blades 90. The blades 90 are reciprocated by the connecting plate 95 which is motivated by motor 13 via connecting rod 15. Hydraulic lines 17 and 19 provide the motor 13 with fluid supply and fluid return conduits.

Referring now to FIGURE 5, a section of the blade arm, and cutting blades and fingers, is presented at the station V—V of FIGURE 4. The cutter or trimmer arm 91 is seen to be rectangular in cross section. It should be noted that the box section blade arm is not oriented parallel to its transverse supporting sleeve 87, but is tilted at a slight angle thereto. This tilting gives a slightly better angle of penetratiton into foliage of the Christmas tree as the trimmer grazes its surface. An evergreen tree-cross-section profile is shown by the circular broken line and the blades 90 and fingers 93 are seen to address a tangent to this curve at an acute angle of incidence. This angle allows the fingers to better engage the irregular foliage rather than merely press it out of the way and allow it to escape the cutting motion of the blades 90. The fingers 93 are bolted or riveted to the box bar or trimmer arm 91 and bear flush against the reciprocating cutting teeth 90, supporting the same from the rear. The cutting teeth 90 are all attached together longitudinally by connecting bar 97 which runs the entire length of the cutter 11 and reciprocates against the wear plate 99, which is merely another elongate bar welded to the box section 91.

The saw tooth knives or cutting blades 90 are held in place from the side opposite to the fingers 93 by the retainer bar 101 which bears against the blades and also runs the entire length of the cutting bar 11. The blades 90 reciprocate between the fingers 93 and the angled retainer plate 101, which is held in place at various selected stations by vertical support tabs 103 riveted to the outer side of the arm 91.

It is now appropriate to consider FIGURE 6 which shows a detailed section of the rotary fluid coupling. The coupling is provided to connect hydraulic lines across the interface between the stationary main frame 66 and the motor 13 on the rotating carriage 27. It will be appreciated that a double linkage is required to cross the moving interface, one traversing passage for the hydraulic feed line 19 and a second traversing passage to accommodate the hydraulic return line 17, from the motor 13. It is perhaps best to consider first the upper chamber section 61, over which is journaled the central hub 35 already mentioned. Fluid connection between the stationary and moving elements is accomplished by a pair of cylindrical chambers coaxially nested one within the other. The inner chamber comprises a passage for fluid supply to the rotating carriage, and the outer chamber is a passage for fluid return from the carriage structure. The lower half of each chamber is telescoped into the upper half to produce a fluid tight arrangement in which the lower half (attached to the rotary carriage) is free to turn or spin inside the upper half (attached to the stationary main frame 66). Thus the outer chamber is comprised of the lower section 33 telescoped into the upper section 61, which in turn is fitted to the main frame 66. A fluid tight relation between the telescoped sections is maintained by rotary seal means 119. Return flow, indicated by the broken arrows, approaches fitting portion

117 from hose 17 and passes upwardly through coupled portions 33 and 61, to the upper fitting 117; and there exists to the stationary main frame 66 via hose 75.

The other leg of the journey (fluid approach) brings fluid from the main frame hose 76 to the upper fitting 130 and into the upper chamber section 131 which is provided with a snap-swivel collar portion 132 that telescopes over the lower chamber section 121. The swivel feature permits the lower tubular portion 121 to spin while the upper portion 131 remains stationary. Other methods of making this fluid tight, rotatable connection could be used. For example the lower section 121 could be telescoped into the upper section 131, in the same telescoped fashion as the outer chamber sections, already described. Flow then proceeds downward to the lower fitting 129 and thence to hose 19 on the rotary carriage. This hose leads, of course, to the sickle or trimmer motor 13, from which fluid returns via hose 17.

In the embodiment of FIGURE 6 a bottom plate 123 is shown bolted to the carriage frame 125. This plate shows one of a variety of possible ways of simultaneously (1) forming an end closure for the outer coupling chamber and (2) providing a rigid connection of both of the lower (rotating) chamber halves to the revolving carriage. Were not the carriage so structurally connected to the turning chamber sections, they would be revolved by the carriage hoses 17 and 19, which would place an undue stress on these hoses.

The plug 133 is removable for the insertion of a tool to release the snap connect 132. The connection of the upper cylinder 61 to the support plate 51 is strengthened by the chock ring 134 welded thereto.

Just as a special coupling is necessary to effect passage of fluid from the stationary to the rotating structure, so also must a special provision be made for the transmission of electric current across the interface between the stationary and rotating structures. This circuit actuates the electric motor 80 already described as situated on an ouboard end of the cutter carriage 27. Current approaches the interface from the stationary side by electric lines 135 which pass through holes in the stationary plate 51 and thence insulators 137 to contact rings 139. The contact rings 139 are connected to, but insulated from, the mounting annulus 141 by the insulators 137. The mounting annulus 141 is attached to the bottom of upper plate 51 by bolts 143 and spacers 145 and remains stationary with the main frame 66. Current from lines 135 is picked up from the contact rings 139 by the rotating spring loaded brushes 147 on mounting plate 149. The mounting plate 149 is insulated and spaced from the drive sprocket 39 by spacer 151. The brushes then relay their received current to the electric motor 80 via electric lines 150 which pass through the center of spacer 151 and into an aperture in the sprocket 39.

OPERATION

In operation, the entire cutting mechanism is carried on the frame of the mobile transport 69 to a position where the apex A of the conical cut would register with the tippity-top of a selected Christmas tree. A valve, not shown, is opened by the operator of the machine, to energize the hydraulic circuit and actuate the hydraulic motors 55 and 13. The carriage 27 then commences its revolution about the centerline designated C—C. The cutter motor 13 simultaneously commences the oscillation of the cutting blades 90 while the cutter bar generates a conical path with apex at A. Cutting fingers accordingly shear the object tree into a neat, symmetric and uniform conical cone shape as desired.

Referring to FIGURE 6, the arrows show passage of hydraulic fluid from motor 55 (not shown) into center pipe 121 and thence to hose 17 and cutter motor 13. Returning from the cutting from the cutter motor, flow is directed into fitting 117 and thence upwardly through the telescoped rotary outer passage (sections 33 and 61) to the exit fitting 117' and hose 75, and thence returning to the source tank (not shown).

The carriage turning mechanism is comprised of the drive wheel 57 on motor 55, drive belt 59, idle wheel 47 which has on the lower end of its shaft idler gear 43, chain 41 and drive sprocket 39 which rotates the entire lower half of the apparatus. The central hub 35 is extended vertically by two spacer sections 105 and 107 which connect to the sprocket 39. The central hub 109 is rotatably mounted anti-frictionally over the upper cylinder section 61 is means of anti-friction ball bearings 111, and vertically secured by snap rings 113. All elements below the drive chain 41 rotate as a unit, under the impulse of the sprocket 39.

The particular mechanisms here illustrated are for demonstation of an operative embodiment. Other elements might easily be substituted, for example other drive means for either the hydraulic or electric motors; an alternate track mechanism for positioning of the trimmer arm on the rotary carriage; or an alternate cutting mechanism for the oscillating blade and stationary fingers of the trimming arm. These and other improvements, modifications and substitutions will be apparent to those skilled in the art, upon study of the herein described operative embodiment, and such improvements, modifications, and substitutions are intended to be included within the scope of the instant invention, which is limited only by the hereinafter appended claims.

We claim:

1. An automatic foliage trimming apparatus comprising:

(1) transportable support means;

(2) a positioning carriage pivotally suspended outboard from said support means; and (3) a foliage cutter pivotally depended from said carriage intermediate the ends thereof in a selectable orientation with respect thereto and rotatable in respect to said carriage;

whereby rotation of said foliage cutter causes said cutter to sweep out a selected geometric surface of revolution.

2. The apparatus of claim 1 wherein said foliage cutter is of a straight line design and the rotation thereof accordingly generates a conical geometric surface.

3. An automatic tree trimming apparatus comprising in combination:

(1) a transportable main frame;

(2) revolving cantilever carriage means pivotally supported on said main frame;

(3) an elongate foliage trimming arm, depended by its upper end from said carriage means at a selected angular and lateral orientation with respect thereto;

(4) drive means mounted to said main frame;

(5) means for transmission of rotary motion from said main frame mounted drive means to said carriage; and (6) drive means for cutting actuation of said foliage trimming arm; whereby revolution of said trimming arm causes said trimming arm to generate a selected surface of revolution.

4. The apparatus of claim 3 wherein the trimming arm comprises:

(1) a revolvable straight-edge, sickle bar, for generation of a conical surface of revolution;

(2) a row of stationary saw tooth finger elements distributed along one edge of said sickle bar; and (3) a row of truncated, bevelled saw tooth blades in planar contact with, and distributed between, said saw tooth fingers, and connected to said trimming arm drive means for oscillation thereby, relative to said fingers, in the longitudinal direction of the sickle bar.

5. The apparatus of claim 4 where said sickle bar is tilted to have its cutting plane disposed at an acute angle to a tangent to the conical surface being addressed by the blades.

6. An automatic Christmas tree trimming apparatus comprising:

(1) transportable support means;

(2) a normally horizontal main frame cantilevered from said transport means;

(3) a first, outer cylindrical chamber mounted on said main frame, and formed by a pair of telescoped cylindrical sections closed at opposite ends and sealed for fluid tight relative rotation therebetween, each cylindrical section having a port in communication with the exterior from within said chamber, and a fitting portion at said port;

(4) a second, inner, cylindrical chamber formed by a pair of telescoped tubular portions nested co-axially within said first outer chamber and sealedly passing through said upper and lower end closures thereof, each end of said inner chamber being provided with a fitting portion;

(5) a drivable central hub rotatably mounted on the upper section of said outer chamber;

(6) a spider integrally depending from said central hub;

(7) a rotary positioning carriage including:

(a) a carriage frame depended from said spider and below said main frame;

(b) a pair of parallel, tubular carriage tracks on said carriage frame;

(c) slide means with cylindrical sleeve portions slidably engaged over said tubular carriage tracks;

(d) an electric motor mounted on said carriage frame and connected by a worm-screw drive to said slide means, for lateral positioning thereof along said carriage tracks;

(8) an elongate trimmer arm pivotally depended from said slide means and oriented for cutting substantially in a plane normal to the pivoting plane of said arm;

(9) an hydraulic oscillatory trimmer motor drivably connected to the cutting blades of said trimmer;

(10) an hydraulic carriage motor mounted on said main frame and drivably connected to said central hub for simultaneous revolution of said carriage and trimmer;

(11) a hose circuit connecting said trimmer motor and said rotary carriage motor, in series, to a common source of fluid pressure, said circuit being transmitted between said stationary main frame and said rotating carriage by the inclusion of said outer and inner telescoped chambers into the return and feed portions respectively of said hose circuit, via connection thereof to said port fittings of said chambers; and

(12) current pickup means for transmission of an electric circuit from said stationary main frame to said electric positioning motor on said revolving carriage.

7. The apparatus of claim 6 with the additional structure comprising:

(1) a drive wheel on said carriage motor, and rotated thereby;

(2) a sprocket on a circumference of said central hub;

(3) a transmission shaft;

(4) an idler wheel on one end of said transmission shaft and driven by said drive wheel by a V-belt;

(5) an idler gear on the other end of said transmission shaft and connected to said hub sprocket by a drive chain.

8. The apparatus of claim 7 with the additional structure comprising:

(1) lift means for pivoting said cantilevered main frame away from the ground during travel of said transport means; and (2) manual tensioning means connected between said sickle bar and its supporting hanger arm structure, for selection of the angle of said sickle bar with respect to vertical.

9. The apparatus of claim 6 wherein said cutting blades are disposed at an acute angle to a tangent to the conical surface addressed by the blades.

References Cited

UNITED STATES PATENTS

| | | | |
|---|---|---|---|
| 1,930,934 | 10/1933 | Healy -------------- | 56—237 |
| 3,246,460 | 4/1966 | Patterson et al. ------ | 56—235 |

ANTONIO F. GUIDA, Primary Examiner